United States Patent
Olson et al.

(10) Patent No.: US 9,108,735 B2
(45) Date of Patent: Aug. 18, 2015

(54) ELECTRO-EXPULSIVE DE-ICING SYSTEM FOR AIRCRAFT AND OTHER APPLICATIONS

(75) Inventors: Richard Alexander Olson, Fallbrook, CA (US); Mark Ronald Bridgeford, Alta Loma, CA (US)

(73) Assignee: TMC AEROSPACE, INC., Los Angeles, CA (US)

( * ) Notice: Subject to any disclaimer, the term of this patent is extended or adjusted under 35 U.S.C. 154(b) by 1234 days.

(21) Appl. No.: 12/658,304

(22) Filed: Feb. 5, 2010

(65) Prior Publication Data

US 2010/0288882 A1 Nov. 18, 2010

Related U.S. Application Data

(60) Provisional application No. 61/216,107, filed on May 13, 2009.

(51) Int. Cl.
  *B64D 15/16* (2006.01)

(52) U.S. Cl.
  CPC .................................. *B64D 15/163* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 3,809,341 A | * | 5/1974 | Levin et al. | 244/134 R |
| 4,678,144 A | * | 7/1987 | Goehner et al. | 244/134 R |
| 4,690,353 A | * | 9/1987 | Haslim et al. | 244/134 D |
| 4,872,644 A | * | 10/1989 | Papapetros | 254/10.5 |
| 4,875,644 A | * | 10/1989 | Adams et al. | 244/134 R |
| 4,894,569 A | * | 1/1990 | Lardiere, Jr. et al. | 310/10 |
| 4,982,121 A | * | 1/1991 | Lardiere, Jr. et al. | 310/10 |
| 5,022,612 A | * | 6/1991 | Berson | 244/134 D |
| 5,074,497 A | | 12/1991 | Phillips, II | |
| 5,107,154 A | * | 4/1992 | Goldberg et al. | 310/10 |
| 5,129,598 A | * | 7/1992 | Adams et al. | 244/134 D |
| 5,142,767 A | * | 9/1992 | Adams et al. | 29/602.1 |
| 5,143,325 A | * | 9/1992 | Zieve et al. | 244/134 D |
| 5,152,480 A | * | 10/1992 | Adams et al. | 244/134 D |
| 5,248,116 A | | 9/1993 | Rauckhorst | |
| 5,272,400 A | | 12/1993 | Goldberg et al. | |
| 5,288,355 A | | 2/1994 | Leffel et al. | |
| 5,314,145 A | | 5/1994 | Rauckhorst, III | |
| 5,326,051 A | * | 7/1994 | Pisarski | 244/134 D |
| 5,346,160 A | * | 9/1994 | Pisarski | 244/134 R |
| 5,429,327 A | * | 7/1995 | Adams | 244/134 D |
| 5,544,845 A | | 8/1996 | Giamati et al. | |
| 5,547,150 A | * | 8/1996 | Adams et al. | 244/134 R |

(Continued)

OTHER PUBLICATIONS

Supplementary European Search Report and Opinion for Application No. EP 10794474, International Filing Date May 21, 2010, Search Completed Sep. 13, 2013, Mailed Sep. 20, 2013, 5 pgs.

*Primary Examiner* — Tien Dinh
*Assistant Examiner* — Michael A Fabula
(74) *Attorney, Agent, or Firm* — KPPB LLP

(57) ABSTRACT

An apparatus for removing ice from an object (e.g., in-flight ice removal from the skin of an aircraft) includes an actuator assembly that forms an elongated electrically conductive loop. The actuator is mounted in a position enabling it to impact the object to be de-iced in response to movement of the loop that is produced by electric current pulses flowing in opposite directions in two mechanically independent loop subassemblies. The loop subassemblies include multiple electrically conductive elements interconnected at their ends using elongated flexible connectors in order to introduce a physical discontinuity that reduces any restriction of relative movement of the subassembly ends caused by the connectors.

32 Claims, 17 Drawing Sheets

(56) References Cited

U.S. PATENT DOCUMENTS

| | | |
|---|---|---|
| 5,553,814 A | 9/1996 | Rauckhorst, III et al. |
| 5,553,815 A * | 9/1996 | Adams et al. ............ 244/134 R |
| 5,584,450 A | 12/1996 | Pisarski |
| 5,657,952 A * | 8/1997 | Goldberg ................. 244/134 R |
| 5,686,003 A | 11/1997 | Ingram |
| 5,782,435 A * | 7/1998 | Ingram et al. ............ 244/134 D |
| 5,921,502 A | 7/1999 | Al-Khalil |
| 6,102,333 A | 8/2000 | Gerardi |
| 6,196,500 B1 | 3/2001 | Al-Khalil |
| 6,207,939 B1 | 3/2001 | Allaire |
| 6,283,411 B1 * | 9/2001 | Giamati et al. ........... 244/134 A |
| RE38,024 E * | 3/2003 | Adams et al. ............ 244/134 D |
| 6,684,647 B2 | 2/2004 | Petrenko |
| 6,870,139 B2 | 3/2005 | Petrenko |
| 7,087,876 B2 * | 8/2006 | Petrenko ...................... 219/770 |
| 7,164,100 B2 | 1/2007 | Petrenko |
| 2013/0187006 A1 | 7/2013 | Olson et al. |

* cited by examiner

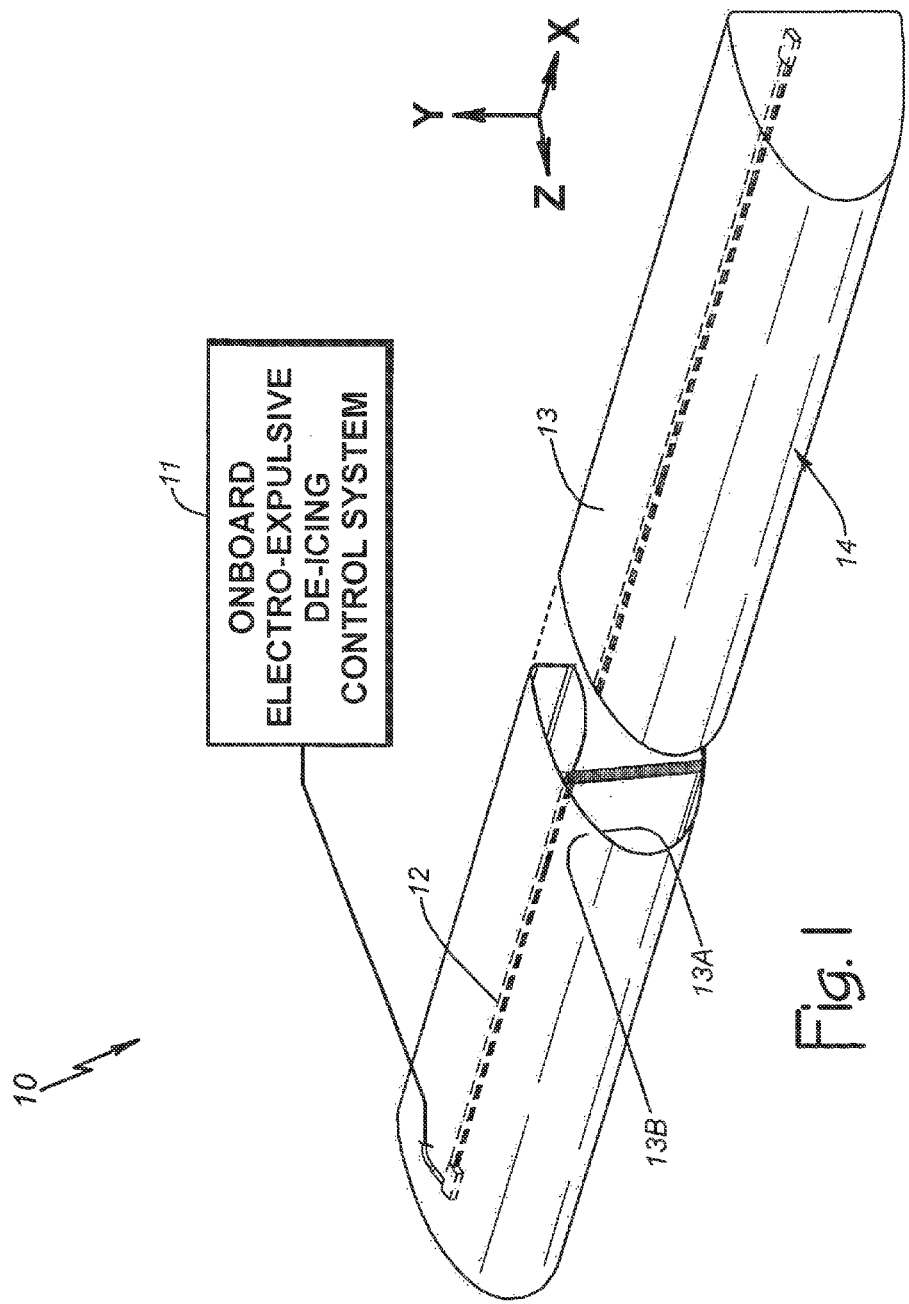

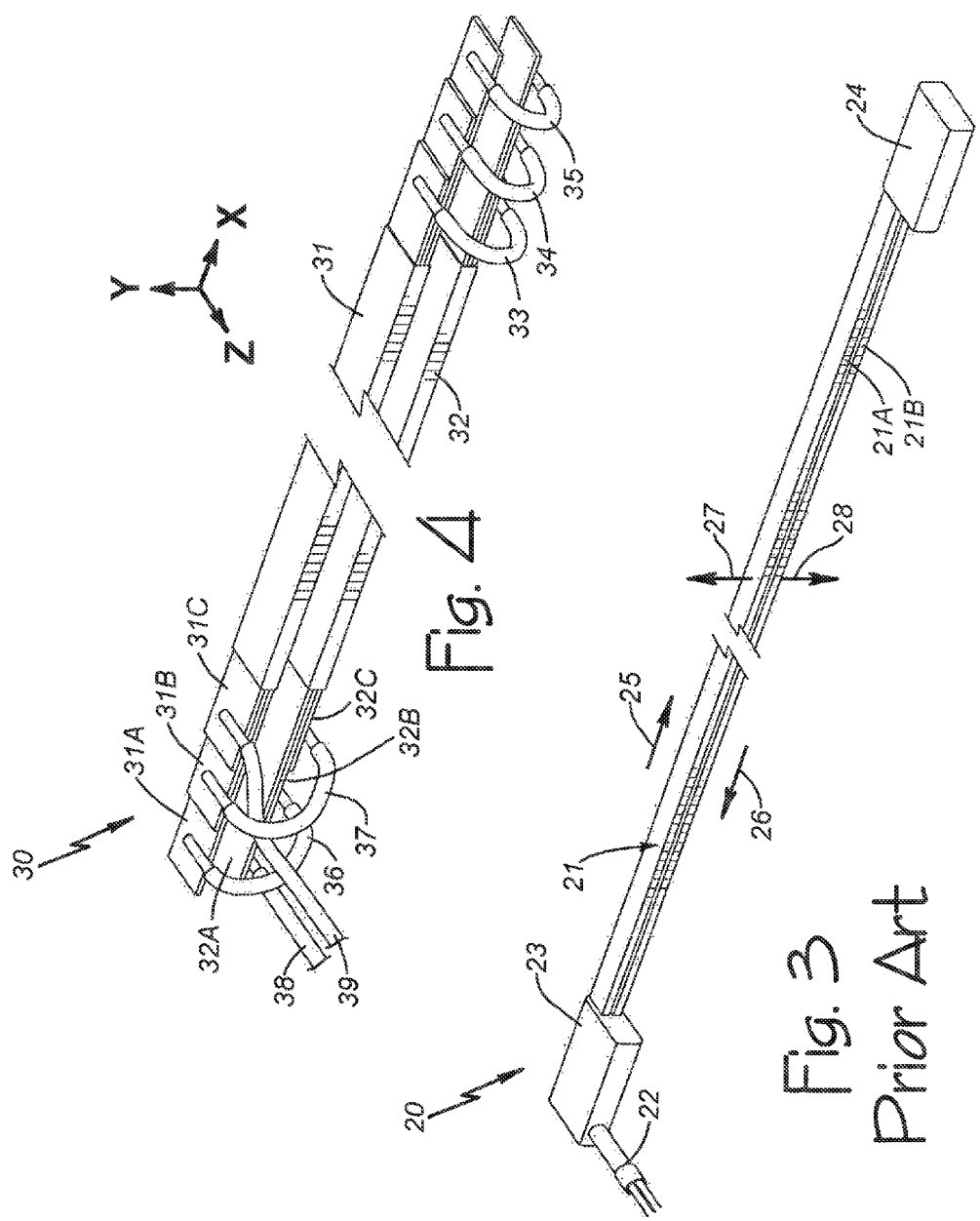

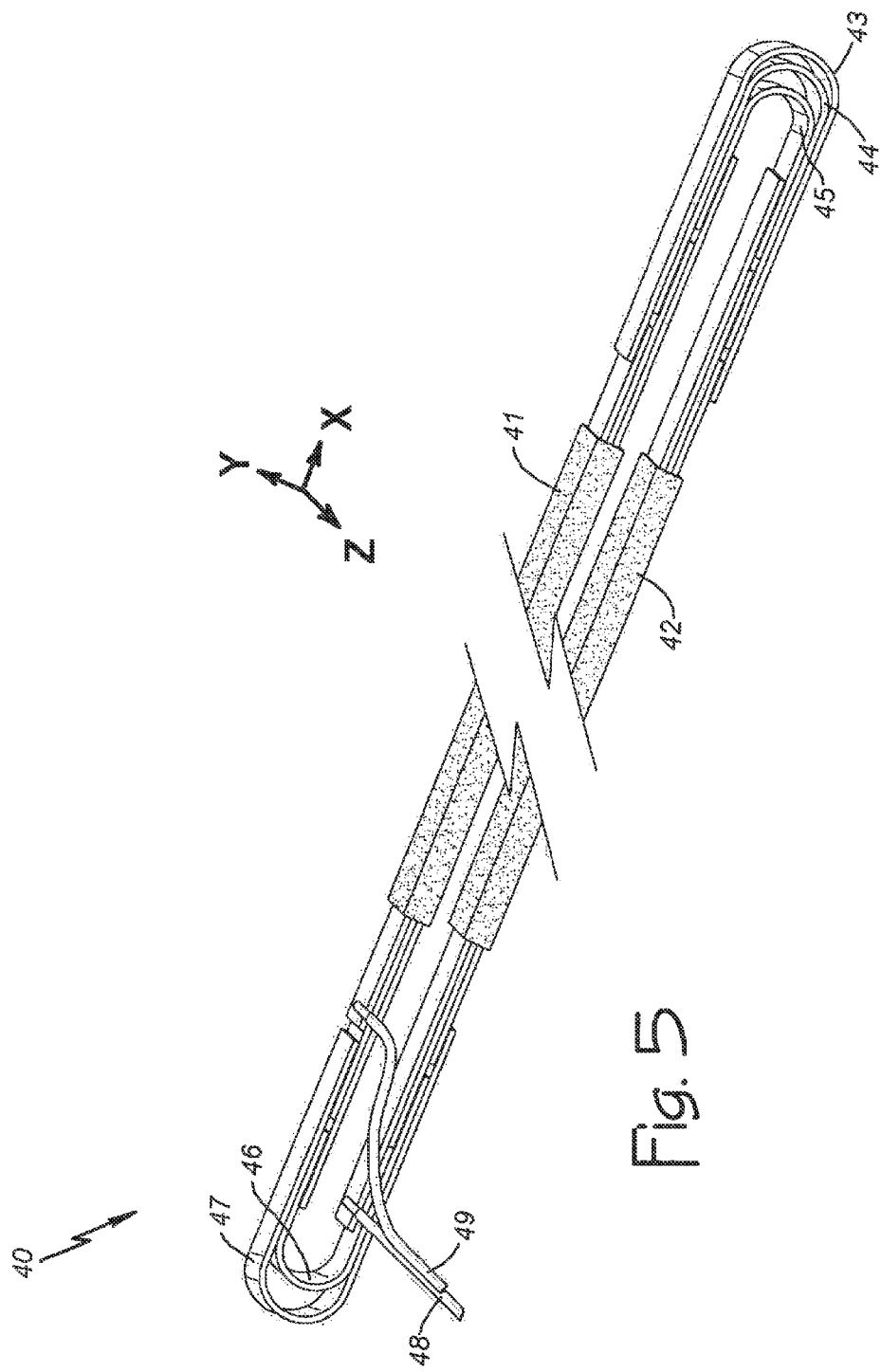

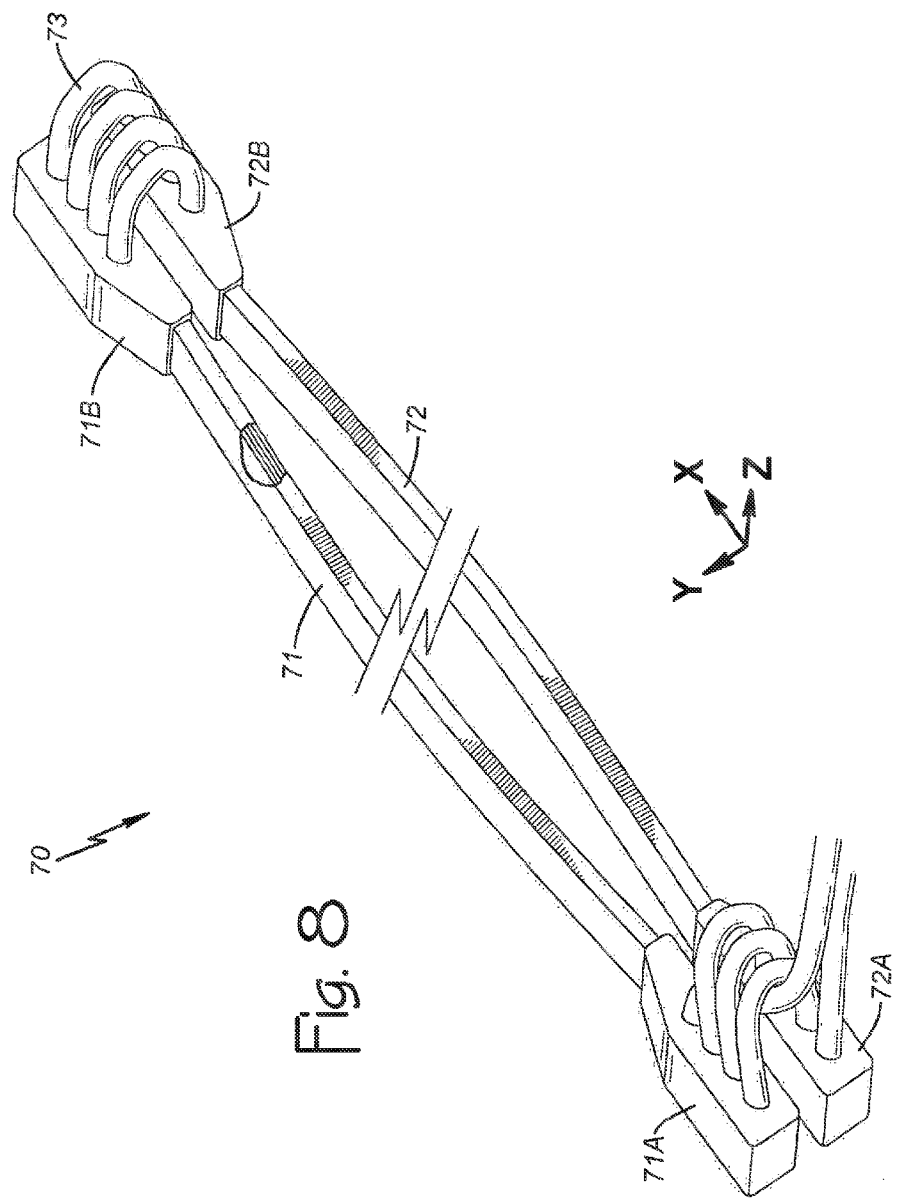

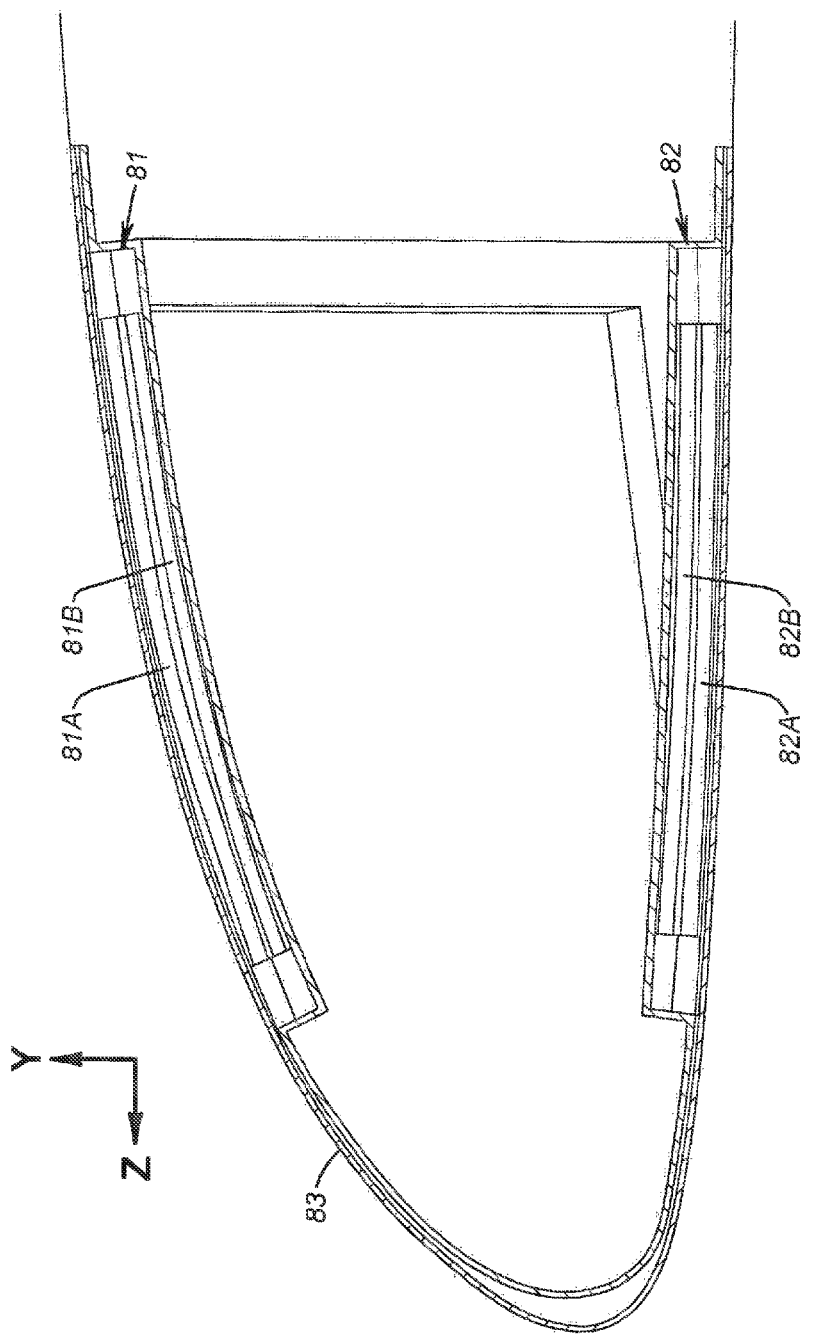

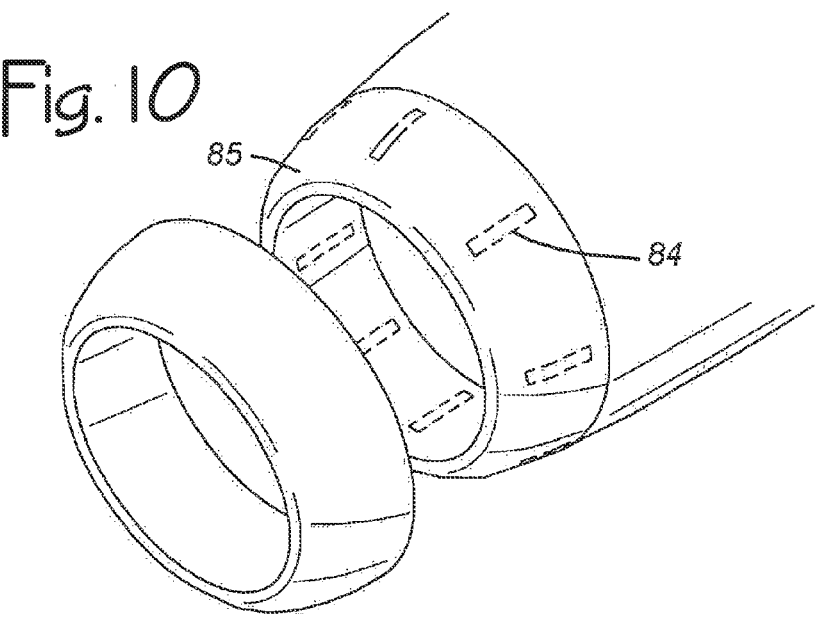
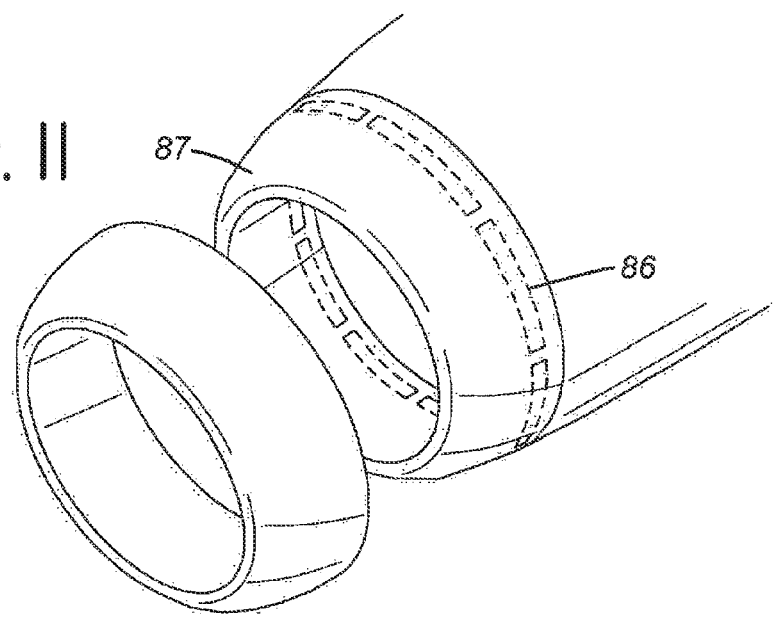

ELECTRO-EXPULSIVE DE-ICING SYSTEM FOR AIRCRAFT AND OTHER APPLICATIONS

CROSS REFERENCE TO RELATED APPLICATION

This application claims the benefit of U.S. Provisional Patent Application Ser. No. 61/216,107 filed May 13, 2009.

BACKGROUND OF THE INVENTION

1. Technical Field

This invention relates generally to the field of in-flight aircraft de-icing and the like, and more particularly to an electro-expulsive de-icing system and its component parts for aircraft and other applications.

2. Description of Related Art

An "electro-expulsive de-icing system" is also sometimes referred to as an "electro-mechanical expulsive de-icing system." It uses electrically produced mechanical motion to knock accumulated ice off a flight surface or other object being de-iced. Recall in that regard that ice removal is an important undertaking because, in the case of aircraft, ice can alter aerodynamic characteristics significantly with catastrophic results. A de-icing system alleviates those concerns.

To accomplish aircraft de-icing, a typical electro-expulsive de-icing system includes electro-mechanical transducers called "actuators" that are installed beneath the skin of various aircraft structures (e.g., the leading edges of wings, horizontal and vertical stabilizers, and engine inlets). In response to in-flight ice formation, an onboard electronic control system passes large current pulses through such actuators (e.g., 8,000-ampere, millisecond duration pulses at 30 to 90-second intervals) in order to thereby produce mechanical motion that produces shock waves in the skin of the aircraft structure. The shock waves result in dislodgement of ice that has accumulated on the skin. The actuator impacts the inner surface of the skin, that action produces the shock waves in the skin, and the shock waves knock the accumulated ice off the outer surface of the skin.

Some such existing electro-expulsive de-icing actuators include strips or ribbons of copper or other electrically conductive material that are mounted beneath the aircraft skin in closely-spaced-apart parallel orientation. Electric current flowing as mentioned above causes the strips to accelerate apart from each other in a manner creating ice-removing shock waves. The electrically conductive strips for some actuators take the form of a copper ribbon wrapped in an elongated multi-turn loop (i.e., a multi-turn coil). A copper ribbon measuring, for example, 0.25 inches to 1.50 inches wide and 0.020 inches to 0.040 inches thick, is wrapped in a multilayer, elongated, loop measuring about one to eight feet in length, with the copper ribbon being wound back on itself at the ends of the loop. Molded blocks of polyurethane encapsulate the two opposite folded ends of the loop while a dielectric coating on the copper ribbon prevents shorting between adjacent turns.

Interconnection of the copper ribbon loop to the onboard electronic control system results in electric current pulses flowing in a first direction in a first half of the loop (from a first folded end of the loop to an opposite second folded end), and in an opposite second direction in a second half of the loop (from the second folded end of the loop to the first folded end). As an electric current pulse flows that way, it results in a large force that tends to mutually repel the first and second halves of the loop. That repulsion results in relative movement of the first and second halves away from each other (e.g., by about 0.08" to 0.50") in a pulse of mechanical motion that is coupled to the aircraft skin. That mechanical pulse results in the de-icing shock waves.

Although effective in many respects, some existing actuators of the type described above have certain drawbacks that need to be overcome. First, impact of the skin can be less than desired for adequate ice removal. Actuator operation is sometimes less robust than desired. In addition, the ends of the loop tend to experience fatigue failure. For those and other reasons that will become apparent from the following detailed descriptions, a need exists for a better actuator assembly that overcomes the drawbacks discussed above.

SUMMARY OF THE INVENTION

In view of the foregoing, it is a primary object of the present invention to provide an electro-expulsive de-icing actuator that alleviates the foregoing concerns. Predicated on a realization that somewhat reduced performance and fatigue failure are a result of the encapsulated loop ends being fixed and unmoveable relative to each other (with essentially a near zero radius at the fold), the present invention achieves the above-stated objective by providing an actuator assembly that includes an electrically conductive loop formed by two mechanically independent loop subassemblies. A first loop subassembly of the two forms a first portion of the electrically conductive loop; current flows in it in a first direction. A second loop subassembly of the two forms a second portion of the electrically conductive loop; current flows in it in an opposite second direction.

The ends of the first and second subassemblies are electrically interconnected by flexible connectors. As a result, the first and second subassemblies (i.e., the first and second portions of the electrically conductive loop) can move apart without the restrictiveness of encapsulated ends. Displacement is less restricted. In addition, the fatigue failure previously experienced at encapsulated ends is avoided. In other words, the inventors of the present invention discovered that mechanical output energy of prior art actuators was being diverted to unproductive deformation and stress in the folded actuator ends and that as a consequence actuator operation was sometimes less robust than desired and the ends of the loop tended to experience the fatigue failure mention previously.

The invention, stated more broadly, provides an apparatus for removing ice from an object, with in-flight ice removal from the skin of an aircraft being one important application. To paraphrase some of the more precise language appearing in the claims and further introduce the nomenclature used, an apparatus constructed according to the invention for impacting an object as part of an electro-expulsive de-icing system includes an assembly referred to as the actuator. The actuator includes multiple electrically conductive elements connected in an electrically conductive loop, and the actuator is mounted on a support structure in a position enabling the loop to impact the object in response to movement of the loop produced by electric current pulses flowing in the loop.

A first subassembly portion of the actuator includes an electrically conductive first element of the loop having two opposite terminal ends referred to as the "first end" and the "second end." The first element extends between the first end and the second end along a first path, with the first element functioning as means for conducting the electric current pulses in a first direction. A second subassembly portion of the actuator includes an electrically conductive second element of the loop having two opposite terminal ends that are referred to as the "third end" and the "fourth end." The second element extends between the third end and the fourth end along a second path that is spaced apart from and generally parallel to the first path, with the second element functioning as means for conducting the electric current pulses in a second direction that is generally opposite the first direction.

According to a major aspect of the invention, means are provided for electrically interconnecting the various terminal ends of the first and second elements in order to thereby form the electrically conductive loop. The means for doing so includes at least a first connector that electrically interconnects the second end and the fourth end without preventing movement of the second end relative to the fourth end. The first connector includes an electrically conductive first conductor attached to the second end and the fourth end that is flexible (e.g., a jumper formed from a length of stranded aircraft wire).

Although the foregoing description focuses on just one pair of elements and one connector, an actuator constructed according to the invention preferably includes multiple element pairs and connectors for a multi-turn loop. In other words, the first subassembly preferably includes a first plurality of electrically conductive elements (e.g., three or four) extending in generally parallel relationship to each other. Similarly, the second subassembly includes a second plurality of electrically conductive elements extending in generally parallel relationship to each other. The ends of those elements are interconnected to form the elongated loop using the elongated flexible connectors mentioned above.

Thus, the invention provides an electro-expulsive de-icing actuator that alleviates performance and fatigue failure concerns of the prior art. The enhanced performance offers greater weight savings and design flexibility. The following illustrative drawings and detailed description make the foregoing and other objects, features, and advantages of the invention more apparent.

BRIEF DESCRIPTION OF THE DRAWINGS

FIG. 1 of the drawings is a diagrammatic view of the leading-edge structure of an aircraft that shows typical actuator placement, with the leading edge structure and the actuator shown foreshortened for illustrative purposes and with an X-Y-Z Cartesian coordinate system included for use in describing various spatial relationships;

FIG. 3 is a perspective view of an actuator having encapsulated ends that restrict relative movement of the first and second halves of the electrically conductive loop;

FIG. 4 is a perspective view of a first embodiment of an actuator constructed according to the present invention that includes an electrically conductive loop formed by two separate subassemblies interconnected by flexible connectors (i.e., jumper wires);

FIG. 5 is a perspective view of a second embodiment of an actuator constructed according to the present invention that includes a second type of flexible connector;

FIG. 8 is a perspective view of a fourth embodiment of an actuator constructed according to the present invention that includes an electrically conductive loop with four turns;

FIG. 9 is a radial cross section view of a portion of an aircraft jet engine intake showing one set of multiple actuator pairs arranged in an axially extending placement of multiple actuators;

FIG. 10 is a diagrammatic view of an aircraft jet engine intake showing axially extending placement of multiple actuators;

FIG. 11 is a diagrammatic view of an aircraft jet engine intake showing circumferentially extending placement of multiple actuators;

FIG. 16a shows lower actuation force per unit length within the invented connector dispersal of actuator current into wide strips; and.

DESCRIPTION OF THE PREFERRED EMBODIMENTS

Figure 2A:
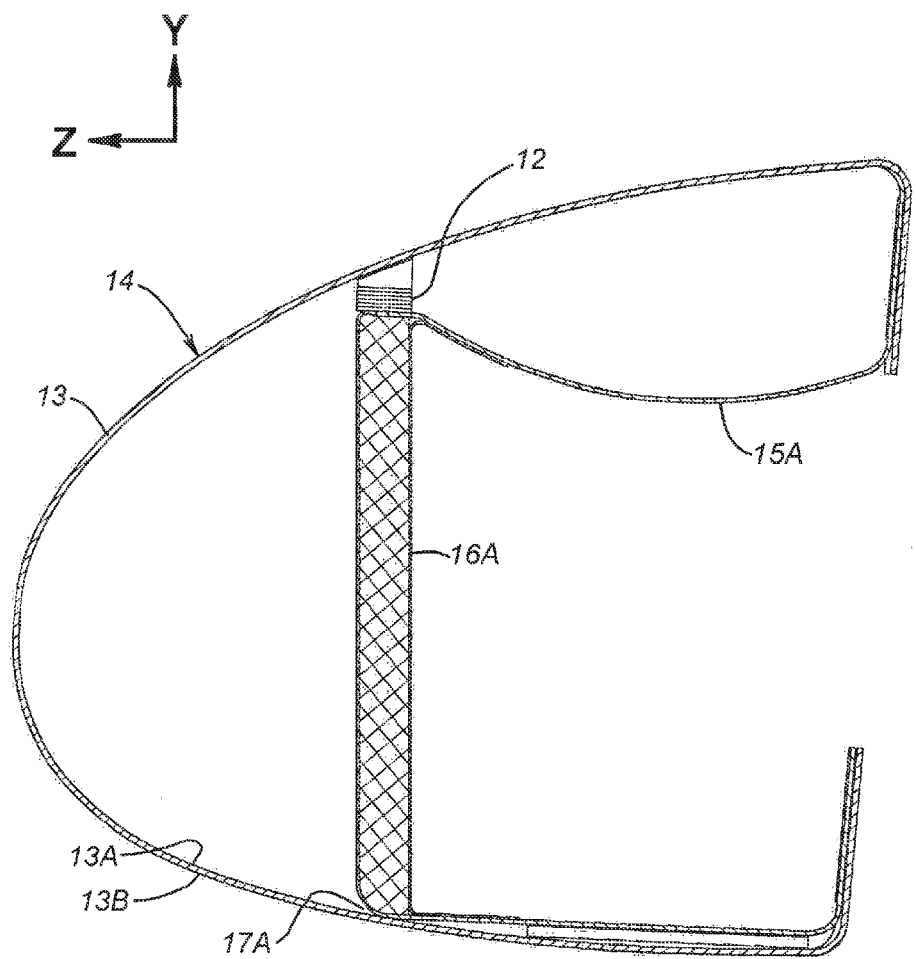
FIG. 2a of the drawings is an enlarged cross section of the leading-edge portion that shows some details of actuator mounting.

FIG. 1 of the drawings is a diagrammatic representation of an electro-expulsive de-icing system 10. Generally, the system 10 includes an electronic control system 11 (i.e., an onboard electro-expulsive de-icing control system) and an actuator 12 that is mounted in a position to impact the skin 13 of an aircraft leading edge structure 14 (i.e., the leading edge portion of a wing, stabilizer, or other aircraft structure). Various surfaces of an aircraft are formed by a "skin" (e.g., sheets of aluminum or composite material) mounted over a "support structure" (e.g., an aluminum or composite framework), and the system 10 operates to dislodge ice (not shown) that has formed on the skin. The actuator 12 responds to electronic pulses from the control system 11 by impacting the skin 13 of the leading edge structure 14 (i.e., an inwardly facing surface 13A of the skin 13), thereby producing shock waves in the skin 13 that dislodge ice that has formed on an outwardly facing surface 13B of the skin 13.

Figure 2B:
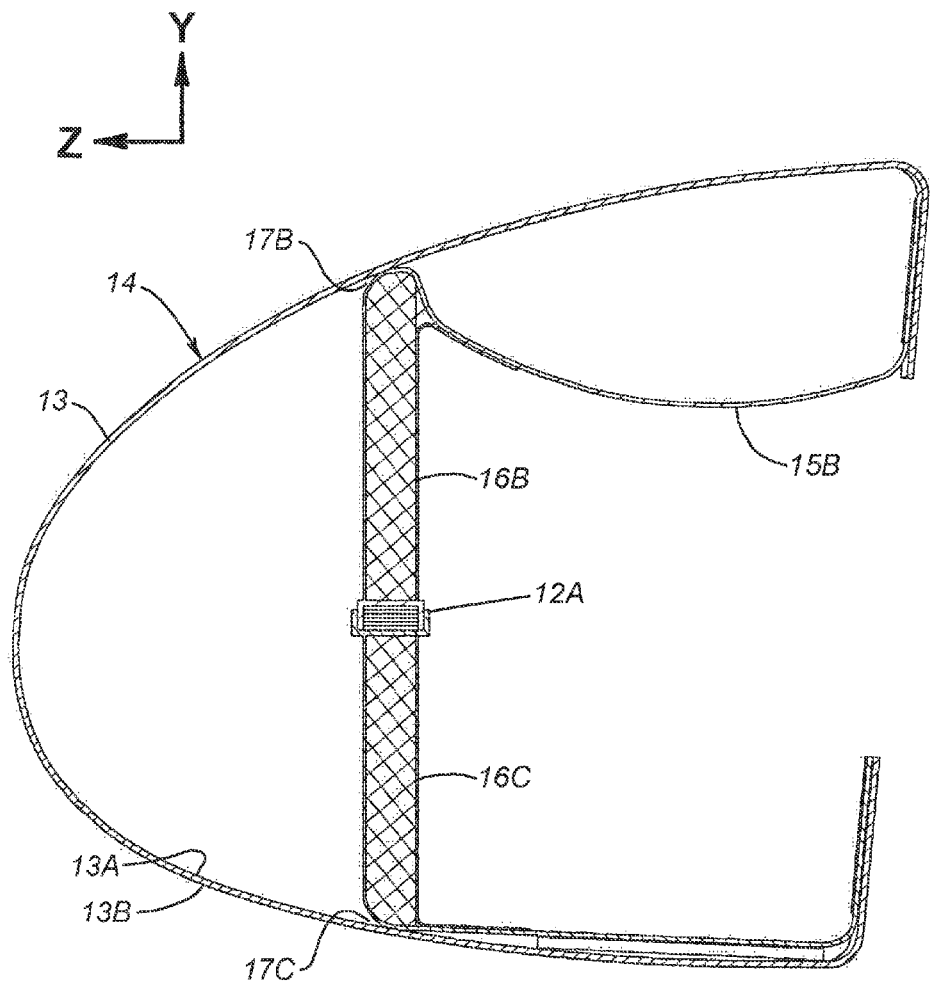
FIG. 2b of the drawings is a cross sectional view of the leading-edge portion that is similar to FIG. 2a, but shows a different actuator placement.
Figure 2C:
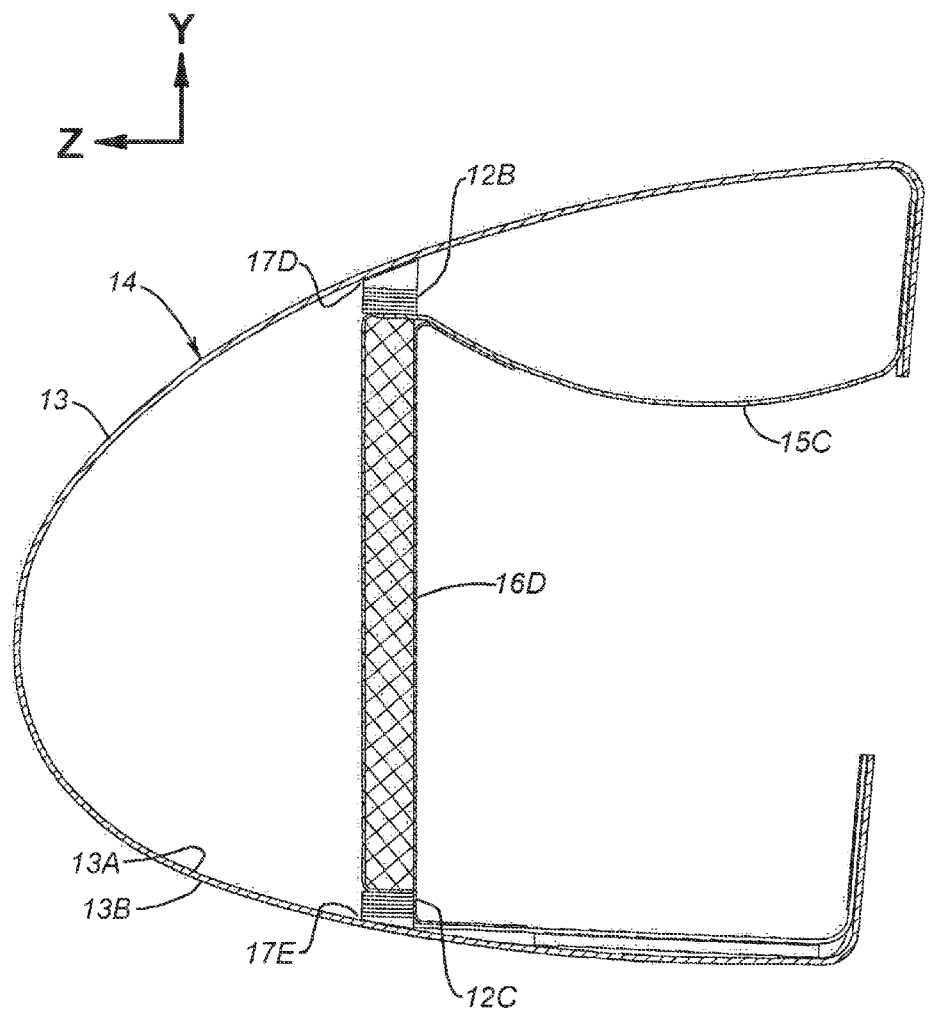
FIG. 2c is a cross sectional view of the leading-edge portion that is similar to FIG. 2a, but shows multiple actuators.

FIGS. 2a, 2b, and 2c illustrate examples of actuator mounting. In FIG. 2a, an actuator 12 is shown attached by bonding or other suitable means to the inwardly facing surface 13A of the skin 13 and to a semi-rigid inner shell 15A. The inner shell 15A is attached by bonding or other suitable means to the leading edge structure 14. It includes a web structure 16A referred to as a "shear web" that adds rigidity (e.g., a lightweight, rigid, composite material) and it transfers force between the actuator 12 and another region of the inwardly facing surface 13A that is identified by a reference numeral 17A. FIG. 2b shows an actuator 12A bonded to an inner shell 15B between first and second web structures 16B and 16C. The first and second web structures 16B and 16C transfer force between the actuator 12A and generally opposite regions 17B and 17C of the inwardly facing surface 13A. FIG. 2c shows multiple actuators, first and second actuators 12B and 12C bonded to the inwardly facing surface 13A (at opposite regions 17D and 17E of the inwardly facing surface 13A) and to an inner shell 15C having a web structure 16D. Other mounting arrangements may be employed for creating shock waves in an object to be de-iced.

FIG. 3 shows an actuator 20 constructed according to the prior art. The actuator 20 includes an electrically conductive ribbon wrapped in an elongated loop 21 that is connected at a connection 22 to an electronic control system (not shown). The loop 21 is folded back against itself at opposite first and second encapsulated ends 23 and 24 of the actuator 20. A first section 21A of the loop 20 conducts electric pulses in a first direction indicated by an arrow 25, while a second section 21B of the loop 20 conducts the electric pulses in an opposite second duration indicated by an arrow 26. As electric current pulses flow that way, the first and second sections 21A and 21B move apart from each other as indicated by arrows 27 and 28. That movement impacts the skin of an aircraft or other object to be de-iced for ice-removal purposes.

With the foregoing comments in mind, next consider FIG. 4. It shows an apparatus constructed according to the present invention for impacting a skin of an aircraft as part of an electro-expulsive de-icing system onboard the aircraft. It is identified as an actuator 30 and it includes a first subassembly 31 having electrically conductive elements 31A, 31B, 31C and a second subassembly 32 having electrically conductive elements 32A, 32B, 32C. The electrically conductive elements of the first and second subassemblies 31 and 32 are connected in a multi-turn electrically conductive loop (i.e., a multi-turn coil) that carries movement-producing electric pulses, but it avoids the first and second encapsulated ends 23 and 24 of the prior art actuator 20, thereby allowing the ends of first and second subassemblies 31 and 32 greater freedom of movement. As a result, actuator performance is improved and fatigue failure is avoided.

The multiple conductive elements 31A, 31B, 31C, 32A, 32B, and 32C are interconnected by flexible connectors 33, 34, 35, 36, and 37 as illustrated, with the connectors 33-37 in FIG. 4 taking the form of jumper wires fabricated from lengths of stranded aircraft wire. Wires 38 and 39 connect the actuator to an onboard electronic control system (not shown in FIG. 4). In terms of claim language, the connectors 33-37 serve as means electrically interconnecting various ones of the terminal ends of the elements in order to thereby form the electrically conductive loop. The connectors 33-37 and the wires 38 and 39 are soldered or otherwise suitably connected to the ends of the elements 31A through 32C. The connectors 33-37 form U-shaped loops such that each U-shaped loop has two elongated leg portions connected by a mid portion, with the elongated leg portions functioning as lever arms that minimize the restrictive effect of the mid portion on relative movement of the first and second subassemblies 31 and 32.

FIG. 5 shows a second embodiment of an apparatus constructed according to the invention. It is identified as an actuator 40, and it is similar in many respects to the actuator 30. For convenience, reference numerals designating parts of the actuator 40 are increased by ten over those designating similar or related parts of the actuator 30. The actuator 40 includes first and second subassemblies 41 and 42, connectors 43-47 that interconnect the ends of multiple electrically conductive elements to form a loop, and wires 48 and 49 that connect the actuator 40 to an onboard electronic control system (not shown). Unlike the actuator 30, however, the connectors 43-47 of the actuator 40 are sections of conductive ribbon in U-shaped configurations (e.g., similar in width and thickness to the ribbon composition of the electrically conductive elements of the first and second subassemblies 41 and 42). Each of the U-shaped connectors 43-47 includes two elongated legs connected to a mid portion, with the elongated leg portions functioning as lever arms that minimize the restrictive effect of the mid portion on relative movement of the first and second subassemblies 41 and 42.

Figure 6:
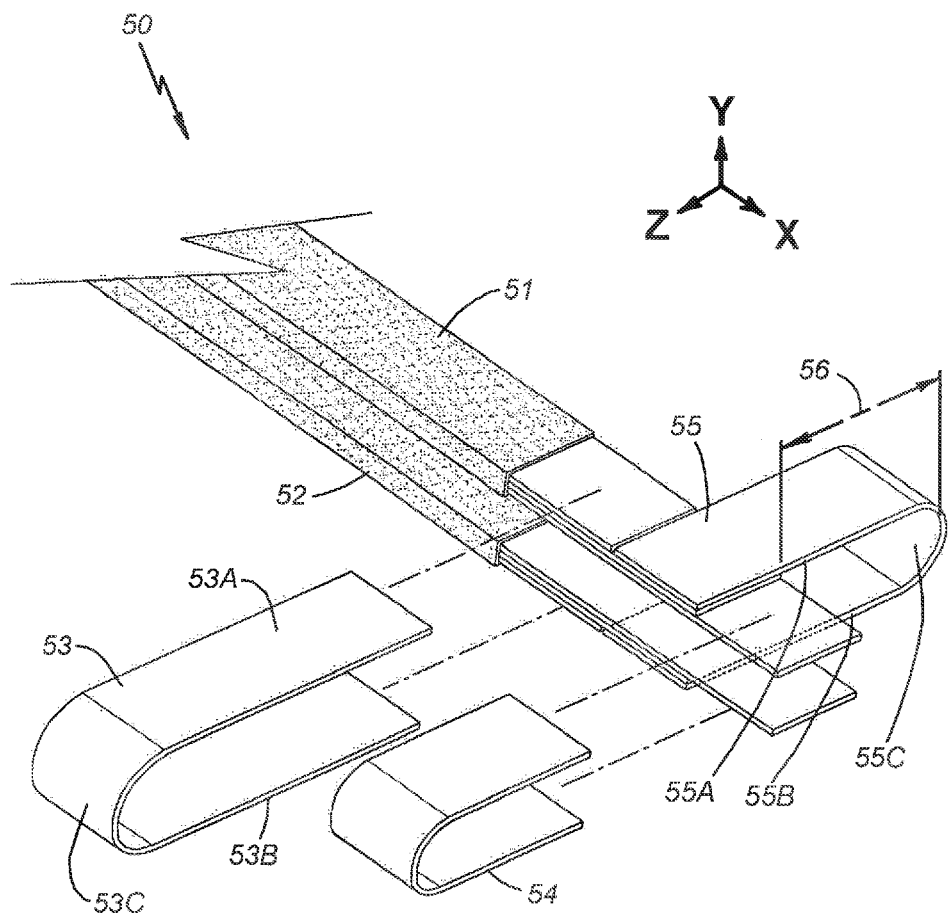
FIG. 6 is a perspective view of a third embodiment of an actuator constructed according to the present invention that includes a third type of flexible connector.

FIG. 6 shows a third embodiment of an apparatus constructed according to the invention. It is identified as an actuator 50, and it is similar in many respects to the actuator 40. For convenience, reference numerals designating parts of the actuator 50 are increased by ten over those designating similar or related parts of the actuator 40. The actuator 50 includes first and second subassemblies 51 and 52, and connectors 53-55 that interconnect the ends of multiple electrically conductive elements to form a loop. Counterparts of the connectors 46 and 47 and the wires 48 and 49 are not shown in FIG. 6 for illustrative convenience.

Unlike the actuator 40 where the axes of elongation of the connectors 43-47 are parallel to the direction of elongation of the electrically conductive loop, the axes of elongation 53A, 53B, 55A and 55B of the connectors 53-55 in FIG. 6 are oriented so that their axes of elongation are perpendicular to the direction of elongation of the electrically conductive loop. That connector orientation is important in some installations for reducing the overall length of the actuator 50. FIG. 6 also identifies a dimension 56 for the connector 55. The dimension 56 is the distance by which the mid portions 53C and 55C of the connectors 53 and 55 are spaced from the element end it is connected to. The dimension 56 should be such that all stresses in the connector material are within acceptable material design limits.

Figure 7A:
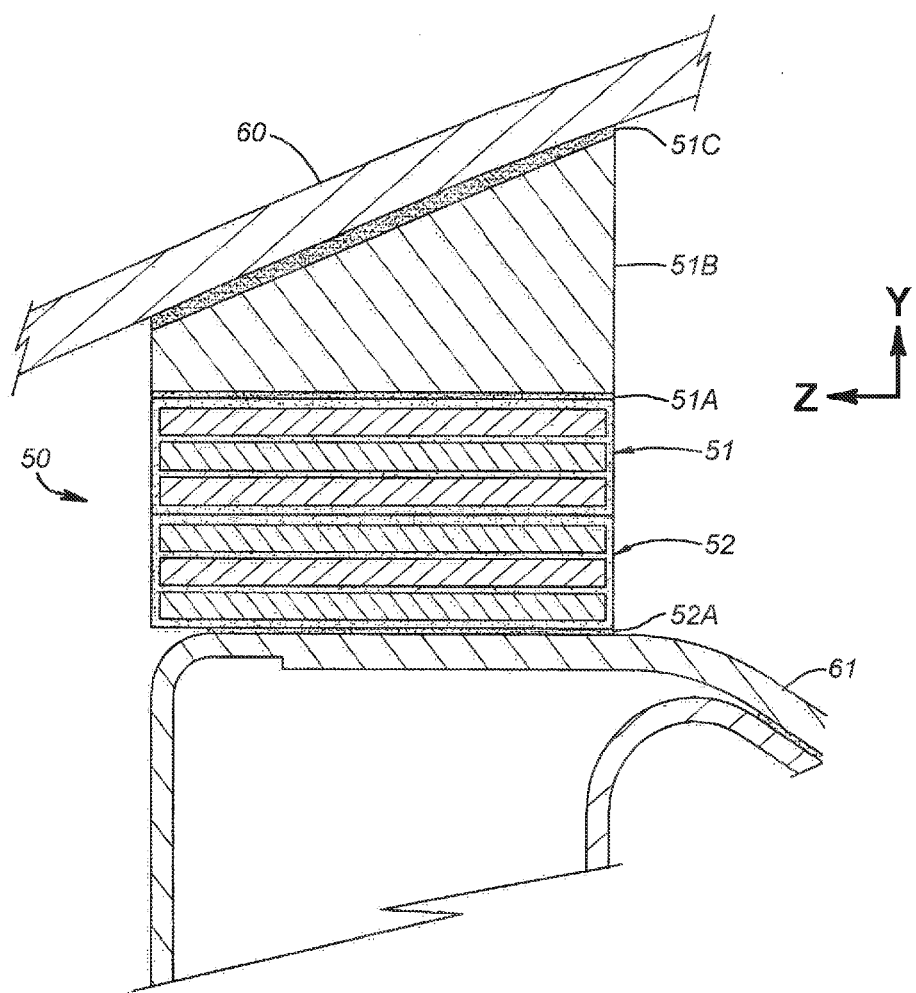
FIG. 7a is an enlarged cross section view of an actuator mounting arrangement.
Figure 7B:
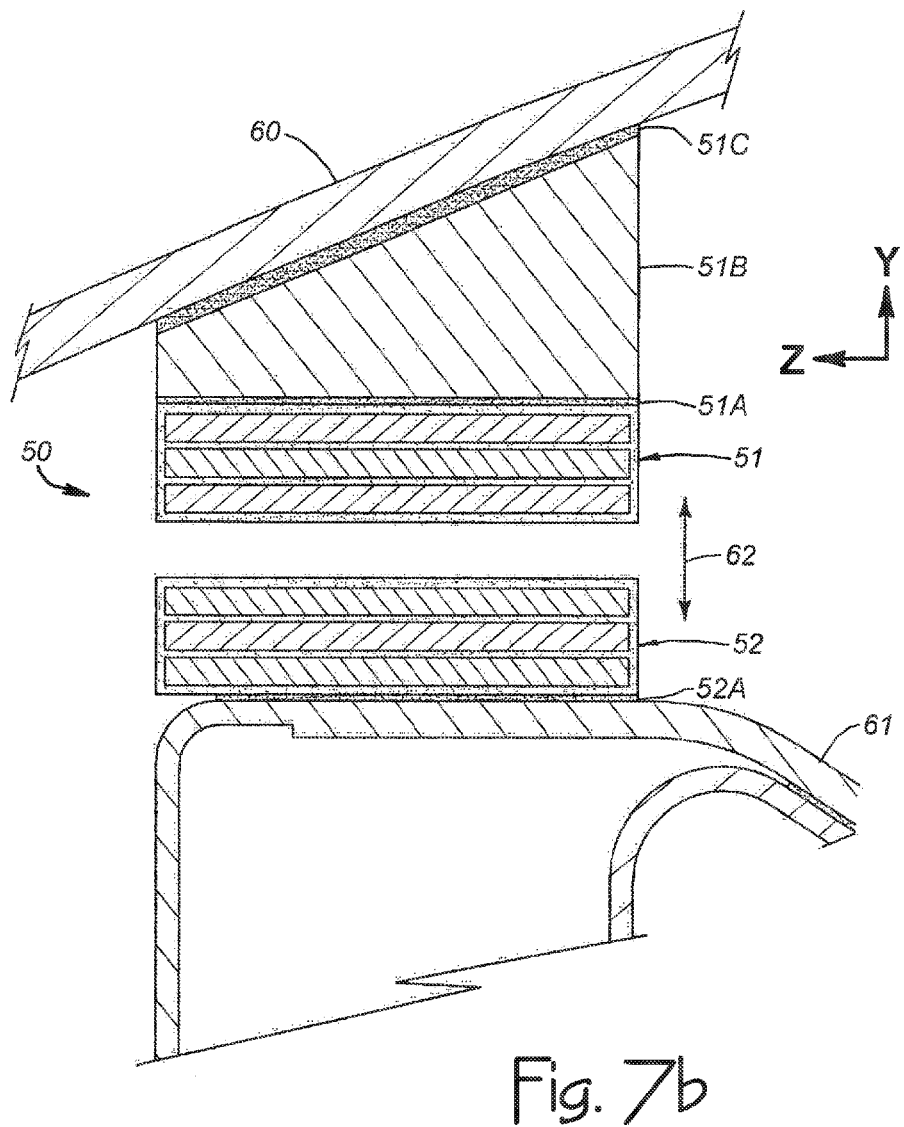
FIG. 7b is an enlarged cross section similar to FIG. 7a, showing the first and second actuator halves (i.e., the first and second subassemblies) separated during a current pulse.

Turning now to FIGS. 7a and 7b, they are enlarged cross sectional views of the actuator 50 installed between a skin 60 of an aircraft and an inner shell 61 (similar in some respects to the installation shown in FIG. 2a). FIG. 7a illustrates an un-energized state of the actuator 50 in which no current pulse is flowing in the conductive loop, while FIG. 7b illustrates an energized state of the actuator 50 in which a current pulse is flowing in the conductive loop. The first subassembly 51 is bonded by a bonding material 51A to a web structure 51B that is bonded by a bonding material 51C to the skin 60. The second subassembly 52 is bonded by a bonding material 52A to the inner shell 61. In the un-energized state, the first and second subassemblies 51 and 52 touch each other. In the energized state shown in FIG. 7b, the first and second subassemblies 51 and 52 move apart (e.g., by 0.08" to 0.50") as indicated by an arrow 62 to thereby cause ice-removing shock waves in the skin 60.

FIG. 8 shows a fourth embodiment of an actuator assembly constructed according to the invention. It is identified as an actuator 70 and it includes first and second subassemblies 71 and 72 such that each has four electrically conductive elements. In addition, the subassemblies 71 and 72 include encapsulated end portions 71A, 71B, 72A, and 72B connected by connectors, such as, for example, a connector 73 connecting two of the elements. Unlike the encapsulated ends of prior art actuators, the encapsulated end portions 71A, 71B, 72A, and 72B do not restrict movement of the subassemblies 71 and 72 relative to each other.

FIGS. 9, 10, and 11 show actuators installed in the forward end portions of jet engine intakes. In FIG. 9, first and second actuators 81 and 82 installed in a forward portion 83 of a jet engine intake. The actuators 81 and 82 are generally similar to the actuators 30, 40, 50 and 70 already described, each having loop-forming first and second subassemblies arranged to move relative to each other for shock-wave-creating purposes without being restricted by encapsulated ends. The actuator 81 includes first and second subassemblies 81A and 81B, while the actuator 82 includes first and second subassemblies 82A and 82B. In FIG. 10, multiple actuators 84 are installed in a circularly shaped forward end portion 85 so that they extend axially; only one actuator 84 is labeled for illustrated convenience. In FIG. 11, multiple actuators 86 are shown diagrammatically installed in a circularly shaped forward end portion 87 so that they extend circumferentially, only one actuator 86 being labeled.

Figure 12:
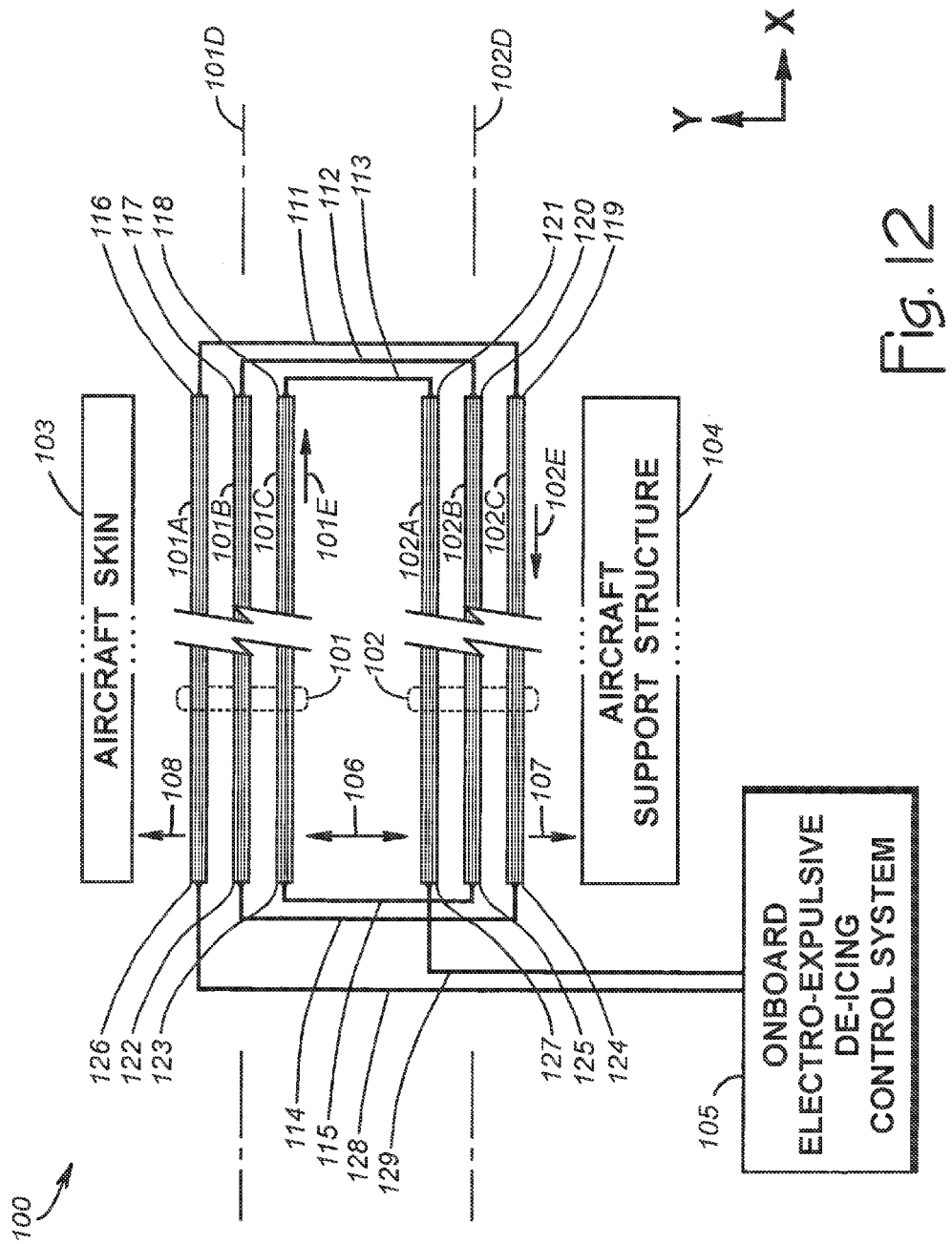
FIG. 12 is a diagrammatic representation of the first actuator embodiment that shows various aspects in further detail.

FIG. 12 provides a diagrammatic review of the invention with reference to an electro-expulsive de-icing system 100. The system 100 includes an actuator assembly having first and second electrically conductive subassemblies 101 and 102 that are mounted on an aircraft between an aircraft skin 103 and an aircraft support structure 104, with the subassemblies 101 and 102 forming a multi-turn electrically conductive loop connected to an onboard electronic control system 105. The control system 105 provides movement-producing electric current pulses to the actuator subassemblies 101 and 102 that cause the first and second subassemblies 101 and 102 to move apart as indicated by an arrow 106 in the X-Y plane, thereby forcefully pushing against the aircraft support structure 104 as indicated by an arrow 107 and against the aircraft skin 103 as indicated by an arrow 108, doing so with a pulse of mechanical energy that creates ice-removing shock waves in the skin 103.

The first subassembly 101 (represented by a broken line at reference numeral 101) includes electrically conductive elements 101A, 101B, and 101C extending along a first path 101D in the X-Y plane that is perpendicular to the Y axis. The broken line is intended to indicate that the elements 101A, 101B, and 101C are part of the first subassembly 101. Similarly, the second subassembly 102 includes electrically conductive elements 102A, 102B, and 102C extending along a second path 102D in the X-Y plane that is generally parallel to the first path 101D. A current pulse flows in the elements 101A, 101B, and 101C of the first subassembly 101 in a first direction indicated by an arrow 101E as the current pulse flows in the elements 102A, 102B, and 102C of the second subassembly 102 in an opposite second direction indicated by an arrow 102E. That current flow results in the first and second assemblies moving apart for ice-removal purposes as indicated by the arrow 106.

The multi-turn electrically conductive loop (i.e., multi-turn coil) includes the following electrical connector and actuator elements: three connectors 111, 112, and 113 connecting respective ends 116, 117, and 118 of the respective elements 101A, 101B, and 101C to respective ends 119, 120, and 121 of the respective elements 102C, 102B, and 102A; and two opposing connectors 114 and 115 connecting respective opposing ends 122 and 123 of respective elements 101B and 101C to respective opposing ends 124 and 125 of elements 102C and 102B. Wires 128 and 129 connect ends 126 and 127 of the elements 101A and 102A to the control system 105. The connectors provide a physical discontinuity in the multi-turn electrically conductive loop (i.e., a mechanical discontinuity as opposed to an electrical discontinuity) that enhances actuator operation by enabling a designer to specify connectors that are less restrictive to separation of loop subassemblies 101 and 102 than a physically continuous loop configuration and better suited to the precise configuration of the actuator. In other words, the mechanical discontinuity enables connector mechanical properties different than the mechanical properties of the rest of the electrically conductive loop; a designer chooses the connector mechanical properties to be less restrictive and thereby to enhance actuator operation. The connectors 111 though 115 are jumpers in the form of flexible loops as depicted by the connector 130 in FIGS. 13a and 13b. The connector 130 includes first and second elongated legs 130A and 130B and mid portion 130C. The legs 130A and 130B extend from the mid portion 130C a distance indicated by a dimension 131 in FIG. 13a, while the mid portion 130C forms a circular arc that extends toward the legs a distance indicated by a dimension 132 in FIG. 13a. The length of the legs 130a and 130B combine with the size of the mid portion 130C to result in the mid portion 130C being located a distance from the elements to which it is connected that is indicated by a dimension 133 in FIG. 13a.

Figure 13A:
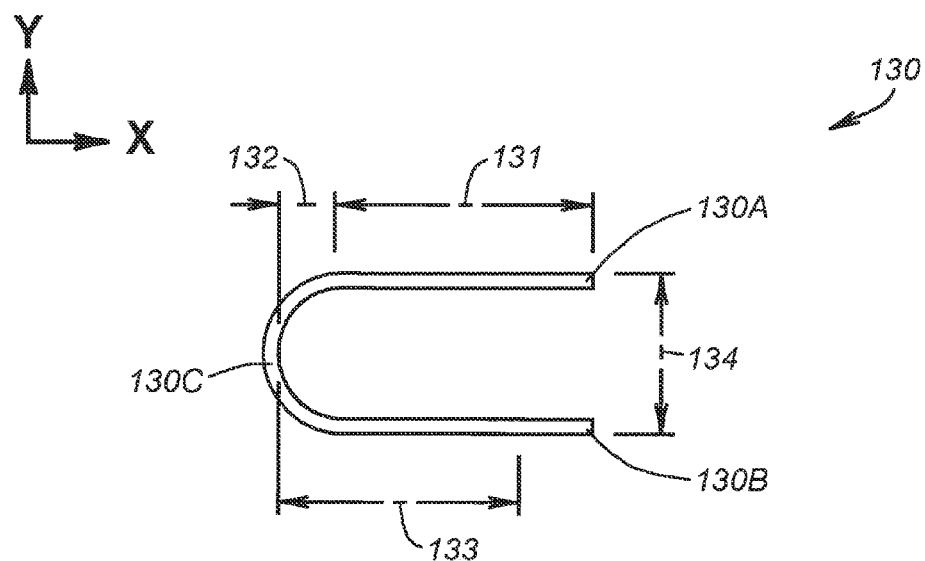
FIG. 13a is a diagrammatic representation of a flexible connector used to electrically interconnect terminal ends of the various elements forming the electrically conductive loop.
Figure 13B:
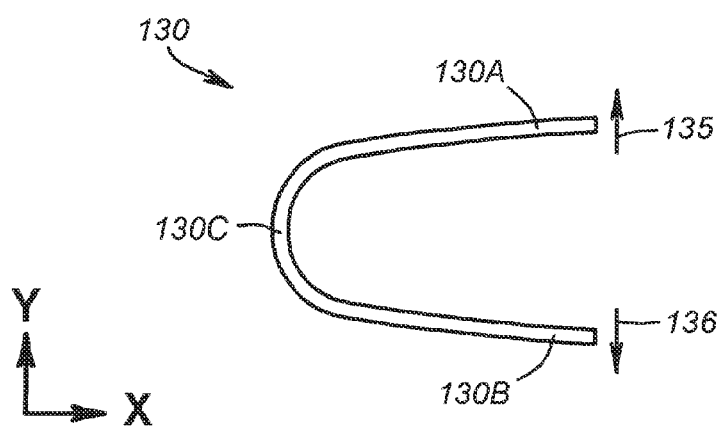
FIG. 13b is a diagrammatic representation similar to FIG. 13a, except that the connector is shown resiliently deformed as it would be in response to relative movement of the two subassemblies that form the electrically conductive loop.

Preferably, the dimension 133 is at least twice the distance that the first and second subassemblies 101 and 102 to which the connector 130 is connected move apart in operation in order that the connector 130 is sufficiently flexible not to restrict such movement significantly. When the actuator to which the connector 130 is connected is in an un-energized state, the connector is in a relaxed state as shown in FIG. 13a, with the legs separated as indicated by a dimension 134 in FIG. 13a. When the actuator is energized by a current pulse, the connector 130 deforms resiliently to the deformed configuration shown in FIG. 13b as depicted by arrows 135 and 136 in FIG. 13b.

Thus, the invention provides an electro-expulsive de-icing actuator that alleviates performance and fatigue failure concerns of the prior art. Although exemplary embodiments have been shown and described, one of ordinary skill in the art may make many changes, modifications, and substitutions without necessarily departing from the spirit and scope of the invention. The system and actuators may be used for ice-removal applications other than in-flight aircraft de-icing. The electro-expulsive de-icing structure (EEDS) can be fabricated in circular configuration for applications such as ship board communication antennas, bridge cabling, and so forth, and in a flat panel configuration for applications such as river way locks or ship board superstructure and so forth. As for the specific terminology used to describe the exemplary embodiments, it is not intended to limit the invention; each specific term is intended to include all technical equivalents that operate in a similar manner to accomplish a similar purpose or function.

Additionally, the connector stress can be reduced by lowering that component of magnetic actuator force generated within the connectors themselves. This deliberate reduction in connector-produced actuation force is accomplished by dispersing the force-generating ampere-turns density and by increasing the length of the distance "d" between mutually opposed current paths as described below (see FIG. 14). This is not a change in the invention as it has been conceived, but a recognition of an additional advantage and intent of already existing features of the invention.

In line with the foregoing, it is further desirable for purposes of reducing connector stress that the connectors generate low mechanical actuation force per unit length of conductor than the respective actuator elements to which they are attached. Connectors comprise among other features of their construction, which may be optional or necessary features of their construction, depending on the particular connector, which render them potentially vulnerable to reliability problems if subjected to repetitive mechanical stresses of the type produced by the prior art in which mechanical coupling of actuator movement induces undesirable stress and fatigue into the connectors themselves. Although the invention provides relief from the effects of mechanical coupling between actuator members and connectors, that same electrical current and magnetic force which gives rise to mechanical displacement in the actuator members likewise produces a mechanical force and stress within the connectors themselves.

Typically, for a given number of ampere-turns of current in an actuator, the said mechanical force generated per unit length of connector would be roughly the same as that mechanical force per unit length generated within the actuator, were the connector of same geometry and dimensional displacement between opposing current paths as the actuator itself. In fact, the practical mechanical force generated within the connector may be in fact larger per unit length than that of the actuator, since the connector region constrains the displacement d during actuation through the restriction of conductor movement near the bends within the connector.

Figure 14:
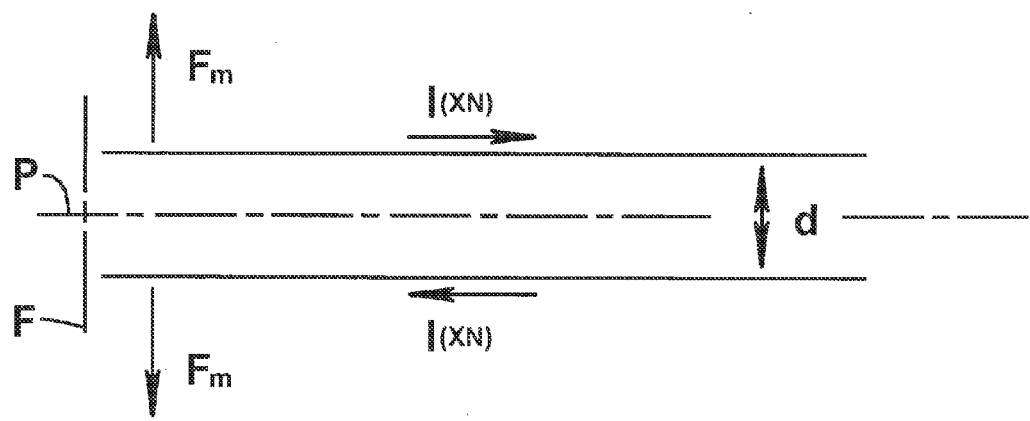
FIG. 14 shows greater actuation force per unit length within a connector of prior art.

With regard to FIG. 14, it shows greater actuation force per unit length within a connector of prior art. The connector designs in the foregoing description, in addition to providing good mechanical stress relief, reduce the actuation force generated within the connector lead wires themselves as will be described below. This is accomplished in the embodiment by dispersing the coil current through connectors configured as wide strips or as individual widely separated wires, thus reducing the undesired connector wire-induced actuation force. The calculation for the magnetic force per unit length in an actuator consisting of two straight wires separated by a distance d is given by well known electromagnetic theory:

$$F_m = I^2 \times N^2 \times \mu_0 / d, \text{ where:}$$

Figure 15:
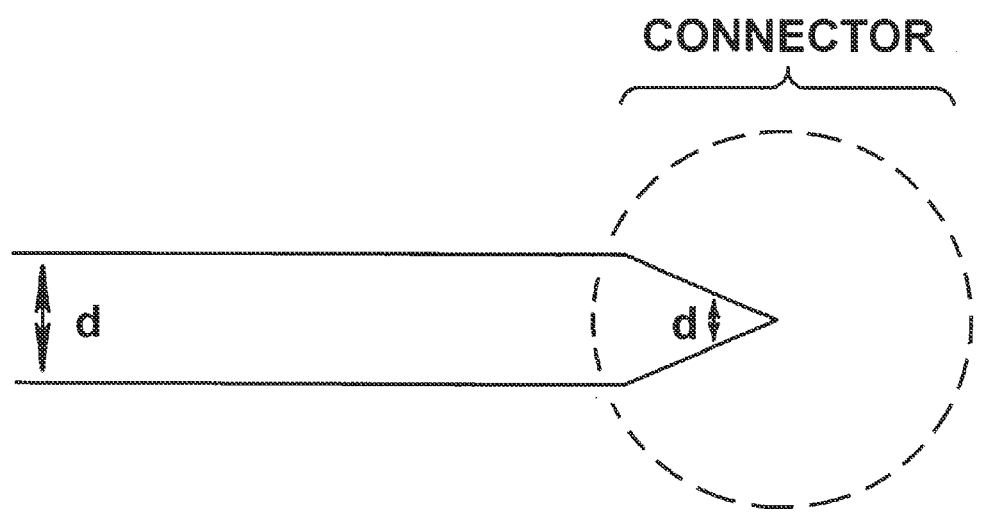
FIG. 15 shows a simple Actuator section magnetic force per unit length.

$F_m$ is the force in Newtons per meter of actuator wire length
I is the current in the wires in Amperes
N is the number of paralleled conductors in each leg
d is the separation distance in meters
$\mu_0$ is the electromagnetic constant $=1.26 \times 10-7$ FIG. 15 shows a simple actuator section magnetic force per unit length. This formula is simple, and does not account for finite wire or strip dimensions, but serves to illustrate the influence on relative actuator forces on their separation distance d and the mathematical square of the wire current. If wire (or strip) cross sectional dimensions were to be taken into account with a more involved calculation, the resulting force would be less. For example, if the same formula were applied to the calculation of force $F_{m2}$ in an actuator consisting of the same pair of wires carrying one half as much current, that is, ½×I, the resulting force would be:

$$F_{m2} = I^2 \times \frac{1}{4} \times N^2 \times \mu_0 / d = F_m / 4$$

If two such actuators were widely separated, and driven in an electrically parallel circuit by the original current I evenly shared between the two, we would have one-half of the original current in each such actuator of force $F_m/4$. If we sum the forces of the two such actuators, we see a resulting force F:

$$F = 2 \times F_m / 4 = F_m / 2$$

A similar argument can be made for distributing the ampere-turns of actuator current into more than two separate, that is, N widely spaced conductors, with an even greater corresponding reduction in actuator force. One can thus extrapolate that the force in an actuator is lessened by distributing the current into more conductors, or, in an equivalent manner, constructing the actuator of wide, flat strip instead of in a small circular cross section. More generally, mutually opposed bundles of conductors, each bundle of given cross sectional geometry G and separated by an average displacement d and carrying equal and opposite current densities will exhibit lower actuation force in response to a given actuation current I when the geometry G is large in maximum or average dimension and/or the displacement d is large.

Figure 16A:
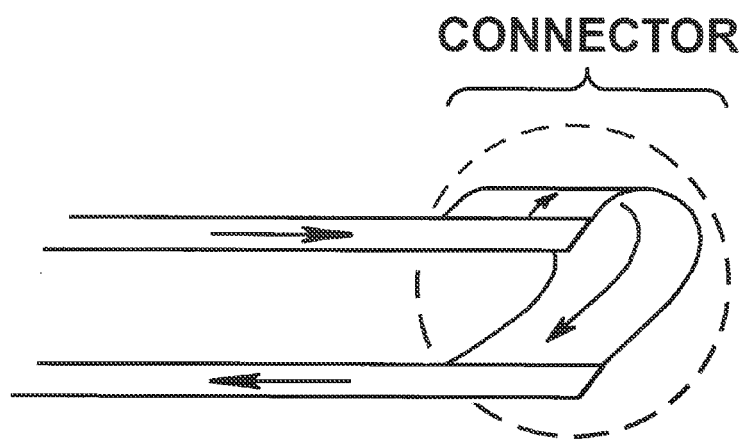
Figure 16B:
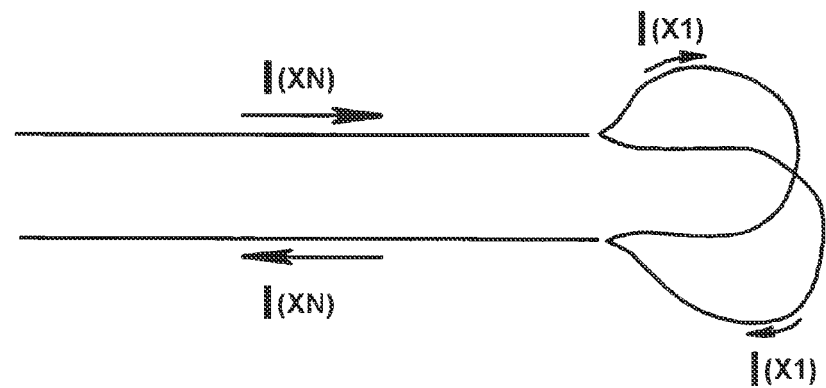
FIG. 16b shows lower actuation force per unit length within the invented connector dispersal of actuator current into multiple separated conductors.

FIG. 16a and FIG. 16b show lower actuation force per unit length within the invented connector dispersal of actuator current into wide strips (FIG. 16a) and into multiple separated conductors (FIG. 16b).

With further regard to the connectors, the invention applies to an electromagnetic actuator having two members mutually opposed and disposed along a path P (e.g., a path extending generally parallel to and midway between the two members shown in FIG. 14). Each of the two members includes one or preferably multiple parallel electrical conductors. Connector ends connect the electrical conductors of the members to carry the actuator current between the two conductors in each of one or more sets of conductor pairs, the two conductors in each pair comprising one conductor from each of the two opposed members. An actuation force F (e.g., the force $F_m$ shown in FIG. 14) is generated in an opposing direction perpendicular to path P by the electromagnetic reaction between the two members. Prior art actuators of such type have connectors extending in a direction substantially parallel with and extending in an extension substantially further along path P, with the connectors contained in a substantially tight bundle within the confines of extended path P such that upon generation of actuation force F the connectors need to draw inward in a contraction along path P in order to permit the movement apart of the actuator members along a path of the direction of force F.

One form of the invention has a type of connectors fabricated and installed in such a way as to extend in a direction substantially divergent from path P so that the connectors relieve the stress of actuator expansion in the direction of force F without drawing the connectors inward along path P. This looks like loops of wire, or like right angle wide flexible strips, per FIGS. 4 and 6. Another form of the invention has another type of connectors fabricated and installed in such a way as to extend in a direction along path P in a substantially loose bundle within the confines of path P; that is, the individual connector loops may spread out along path P such that the connectors relieve the stress of actuator expansion in the direction of force F without drawing all of the connectors in a bundle together inward along path P at the same rate. That also lessens the fatigue in the connector material by maintaining a thinner effective flexing loop cross section. This looks like spreading out the loops in each actuator connector along the path P, per FIG. 5. The two forms can be combined in any way without departing from the spirit of the invention.

What is claimed is:

1. An electro-expulsive de-icing actuator comprising:
   a first subassembly comprising:
      a first electrically conductive element coupled to an electrical input at a first end of the first electrically conductive element;
   a second subassembly comprising:
      a second electrically conductive element coupled to an electrical output at a first end of the second electrically conductive element;
   wherein the first and second subassemblies are mechanically independent;
   at least one separate electrically conductive connector connecting a second end of the first electrically conductive element of the first subassembly to a corresponding second end of the second electrically conductive element of the second subassembly, thereby creating a conductive path from the electrical input to the electrical output;

wherein the first and second subassemblies are disposed in an orientation such that an electrical current flows in a single first direction along a single longitudinal axis of the actuator through the first subassembly and in a single opposite, parallel direction along the single longitudinal axis through the second subassembly such that when electrical current flows through the conductive path, at least a portion of each of the first and second subassemblies move apart relative to one another as a result of the magnetic fields created by the electrical current in the first and second subassemblies; and wherein the at least one connector is configured to allow the second end of the first subassembly and the second end of the second subassembly to move apart relative to each other.

2. The electro-expulsive de-icing actuator according to claim 1, wherein the first subassembly comprises:

a plurality of electrically conductive elements;

wherein each of the plurality of electrically conductive elements is separately electrically interconnected in series to the second subassembly through a plurality of separate electrically conductive connectors of the at least one connector, to form the conductive path between the input and the output, such that the current flows through each of the plurality of electrically conductive elements of the first subassembly along the single first direction, and wherein each of the plurality of electrically conductive elements of the first subassembly are mechanically interconnected and electrically insulated from one another in a substantially stacked, parallel configuration.

3. The electro-expulsive de-icing actuator according to claim 2, wherein the second subassembly comprises:

a plurality of electrically conductive elements;

wherein each of the plurality of electrically conductive elements of the second subassembly is separately electrically interconnected in series to the plurality of electrically conductive elements of the first subassembly through a plurality of separate electrically conductive connectors of the at least one connector, to form the conductive path between the input and the output, such that the current flows through each of the plurality of electrically conductive elements of the second subassembly along the single second direction, and wherein each of the plurality of electrically conductive elements of the second subassembly are mechanically interconnected and electrically insulated from one another in a substantially stacked, parallel configuration.

4. The electro-expulsive de-icing actuator according to claim 3, wherein the first and second subassemblies comprise an equal number of electrically conductive elements;

wherein each of the separate electrically conductive connectors electrically interconnects a second end of one of the plurality of electrically conductive elements of the first subassembly to a second end of one of the plurality of electrically conductive elements of the second subassembly, such that pairs of the plurality of electrically conductive elements of the first and second subassemblies are electrically interconnected in series to form the conductive path between the input and output.

5. The electro-expulsive de-icing actuator according to claim 4, wherein the electrically conductive connectors interconnecting the second ends of the first and second subassemblies form a first plurality of connectors;

wherein a first end of one of the plurality of electrically conductive elements of the first subassembly is interconnected to the input and a first end of one of the plurality of electrically conductive elements of the second subassembly is interconnected to the output;

wherein the at least one electrically conductive connector further comprises a second plurality of electrically conductive connectors;

wherein each of the second plurality of connectors electrically interconnects one of the remaining first ends of one of the plurality of electrically conductive elements of the first subassembly to one of the remaining first ends of one of the plurality of electrically conductive elements of the second subassembly, such that the plurality of electrically conductive elements of the first and second subassemblies are electrically interconnected in series to form the conductive path between the input and output.

6. The electro-expulsive de-icing actuator according to claim 1, wherein the at least one connector is flexible.

7. The electro-expulsive de-icing actuator according to claim 1, wherein the at least one connector comprises a stranded aircraft wire.

8. The electro-expulsive de-icing actuator according to claim 1, wherein the at least one connector comprises a U-shaped loop.

9. The electro-expulsive de-icing actuator according to claim 1, wherein a longitudinal axis of the at least one connector is parallel to the longitudinal axis of the actuator.

10. The electro-expulsive de-icing actuator according to claim 1, wherein a longitudinal axis of the at least one connector is perpendicular to the longitudinal axis of the actuator.

11. The electro-expulsive de-icing actuator according to claim 1, wherein each end of the first and second subassemblies is encapsulated.

12. The electro-expulsive de-icing actuator according to claim 1, wherein the actuator is mounted to one aircraft structure selected from the group of:

an inner shell;

a support structure interconnected with an inner shell; and a skin which encloses an inner shell interconnected with a support structure, wherein the skin comprises an inner surface connected to the inner shell and an outer surface.

13. The electro-expulsive de-icing actuator according to claim 12, wherein the actuator is mounted between the inner surface of the skin and the inner shell.

14. The electro-expulsive de-icing actuator according to claim 12, wherein the support structure comprises:

a first support structure, and a second support structure;

wherein the actuator is mounted between the first and second support structures.

15. An aircraft structure comprising:

a skin having:

an inner surface, and an outer surface;

an inner shell;

a support structure; and a plurality of electro-expulsive de-icing actuators in accordance with claim 1;

wherein the skin encloses the inner shell and is connected thereto through the inner surface;

wherein the inner shell is interconnected with the support structure; wherein a first actuator in the plurality of actuators is mounted between a first end of the inner shell and the inner surface of the skin, and wherein a second actuator is mounted between an opposite end of the inner shell and the inner surface of the skin.

16. The electro-expulsive de-icing actuator according to claim 1, wherein the actuator is attached to a leading edge structure of an aircraft.

17. A method of electro-expulsively de-icing comprising:
providing an electro-expulsive de-icing actuator comprising:
a first subassembly comprising:
a first electrically conductive element coupled to an electrical input at a first end of the first electrically conductive element;
a second subassembly comprising:
a second electrically conductive element coupled to an electrical output at a first end of the second electrically conductive element;
wherein the first and second subassemblies are mechanically independent;
at least one separate electrically conductive connector connecting a second end of the first electrically conductive element of the first subassembly to a corresponding second end of the second electrically conductive element of the second subassembly, thereby creating a conductive path from the electrical input to the electrical output;
wherein the first and second subassemblies are disposed in an orientation such that an electrical current flows in a single first direction along a single longitudinal axis of the actuator through the first subassembly and in a single opposite, parallel direction along the single longitudinal axis through the second subassembly such that when electrical current flows through the conductive path, at least a portion of each of the first and second subassemblies move apart relative to one another as a result of the magnetic fields created by the electrical current in the first and second subassemblies; and
wherein the at least one connector is configured to allow the second end of the first subassembly and the second end of the second subassembly to move apart relative to each other; and
providing an electrical current in the electro-expulsive de-icing actuator.

18. The method of electro-expulsively de-icing according to claim 17, wherein the first subassembly comprises:
a plurality of electrically conductive elements;
wherein each of the plurality of electrically conductive elements is separately electrically interconnected in series to the second subassembly through a plurality of separate electrically conductive connectors of the at least one connector, to form the conductive path between the input and the output, such that the current flows through each of the plurality of electrically conductive elements of the first subassembly along the single first direction, and
wherein each of the plurality of electrically conductive elements of the first subassembly are mechanically interconnected and electrically insulated from one another in a substantially stacked, parallel configuration.

19. The method of electro-expulsively de-icing according to claim 18, wherein the second subassembly comprises:
a plurality of electrically conductive elements;
wherein each of the plurality of electrically conductive elements of the second subassembly is separately electrically interconnected in series to the plurality of electrically conductive elements of the first subassembly through a plurality of separate electrically conductive connectors of the at least one connector, to form the conductive path between the input and the output, such that the current flows through each of the plurality of electrically conductive elements of the second subassembly along the single second direction, and
wherein each of the plurality of electrically conductive elements of the second subassembly are mechanically interconnected and electrically insulated from one another in a substantially stacked, parallel configuration.

20. The method of electro-expulsively de-icing according to claim 19, wherein the first and second subassemblies comprise an equal number of electrically conductive elements;
wherein each of the separate electrically conductive connectors electrically interconnects a second end of one of the plurality of electrically conductive elements of the first subassembly to a second end of one of the plurality of electrically conductive elements of the second subassembly, such that pairs of the plurality of electrically conductive elements of the first and second subassemblies are electrically interconnected in series to form the conductive path between the input and output.

21. The method of electro-expulsively de-icing according to claim 20, wherein the electrically conductive connectors interconnecting the second ends of the first and second subassemblies form a first plurality of connectors;
wherein a first end of one of the plurality of electrically conductive elements of the first subassembly is interconnected to the input and a first end of one of the plurality of electrically conductive elements of the second subassembly is interconnected to the output;
wherein the at least one electrically conductive connector further comprises a second plurality of electrically conductive connectors;
wherein each of the second plurality of connectors electrically interconnects one of the remaining first ends of one of the plurality of electrically conductive elements of the first subassembly to one of the remaining first ends of one of the plurality of electrically conductive elements of the second subassembly, such that the plurality of electrically conductive elements of the first and second subassemblies are electrically interconnected in series to form the conductive path between the input and output.

22. The method of electro-expulsively de-icing according to claim 17, wherein the at least one connector is flexible.

23. The method of electro-expulsively de-icing according to claim 17, wherein the at least one connector comprises a stranded aircraft wire.

24. The method of electro-expulsively de-icing according to claim 17, wherein the at least one connector comprises a U-shaped loop.

25. The method of electro-expulsively de-icing according to claim 17, wherein a longitudinal axis of the at least one connector is parallel to the longitudinal axis of the actuator.

26. The method of electro-expulsively de-icing according to claim 17, wherein a longitudinal axis of the at least one connector is perpendicular to the longitudinal axis of the actuator.

27. The method of electro-expulsively de-icing according to claim 17, wherein each end of the first and second subassemblies is encapsulated.

28. The method of electro-expulsively de-icing according to claim 17, wherein the actuator is mounted to one aircraft structure selected from the group of:
an inner shell;
a support structure interconnected with an inner shell; and
a skin which encloses an inner shell interconnected with a support structure, wherein the skin comprises an inner surface connected to the inner shell and an outer surface.

29. The method of electro-expulsively de-icing according to claim 28, wherein the actuator is mounted between the inner surface of the skin and the inner shell.

30. The method of electro-expulsively de-icing according to claim 28, wherein the support structure comprises:
   a first support structure, and
   a second support structure;
   wherein the actuator is mounted between the first and second support structures.

31. A method of electro-expulsively de-icing an aircraft structure comprising:
   providing an aircraft structure comprising:
      a skin having:
         an inner surface, and
         an outer surface;
      an inner shell;
      a support structure; and
      a plurality of electro-expulsive de-icing actuators in accordance with claim 1;
      wherein the skin encloses the inner shell and is connected thereto through the inner surface;
      wherein the inner shell is interconnected with the support structure; wherein a first actuator in the plurality of actuators is mounted between a first end of the inner shell and the inner surface of the skin, and
      wherein a second actuator is mounted between an opposite end of the inner shell and the inner surface of the skin; and
   providing an electrical current in the electro-expulsive de-icing actuator.

32. The method of electro-expulsively de-icing according to claim 17, wherein the actuator is attached to a leading edge structure of an aircraft.

* * * * *